(12) United States Patent
Frankenstein

(10) Patent No.: US 10,598,083 B2
(45) Date of Patent: Mar. 24, 2020

(54) TURBINE FOR AN EXHAUST TURBOCHARGER

(71) Applicant: CONTINENTAL AUTOMOTIVE GMBH, Hannover (DE)

(72) Inventor: Dirk Frankenstein, Flörsheim-Dalsheim (DE)

(73) Assignee: Vitesco Technologies GmbH, Hannover (DE)

( * ) Notice: Subject to any disclaimer, the term of this patent is extended or adjusted under 35 U.S.C. 154(b) by 62 days.

(21) Appl. No.: 15/928,894

(22) Filed: Mar. 22, 2018

(65) Prior Publication Data

US 2018/0209329 A1    Jul. 26, 2018

Related U.S. Application Data

(63) Continuation of application No. PCT/EP2016/069835, filed on Aug. 22, 2016.

(30) Foreign Application Priority Data

Sep. 24, 2015   (DE) .......................... 10 2015 218 335

(51) Int. Cl.
| | |
|---|---|
| *F02B 37/02* | (2006.01) |
| *F02B 37/18* | (2006.01) |
| *F02B 37/22* | (2006.01) |
| *F01D 17/14* | (2006.01) |
| *F02C 6/12* | (2006.01) |

(52) U.S. Cl.
CPC ............ *F02B 37/22* (2013.01); *F01D 17/148* (2013.01); *F02B 37/025* (2013.01); *F02B 37/183* (2013.01); *F02C 6/12* (2013.01); *F05D 2220/40* (2013.01); *Y02T 10/144* (2013.01)

(58) Field of Classification Search
CPC .... F01D 17/148; F02B 37/025; F02B 37/183; F02B 37/22; Y02T 10/144
See application file for complete search history.

(56) References Cited

U.S. PATENT DOCUMENTS 3,423,926 A * 1/1969 Nancarrow ............. F01D 9/026
                                                        415/146
3,614,259 A * 10/1971 Neff ......................... F01D 9/026
                                                        415/205
4,008,572 A   2/1977 Woollenweber, Jr.
(Continued)

FOREIGN PATENT DOCUMENTS

| CN | 104005837 A | 8/2014 |
|---|---|---|
| DE | 3145835 A1 | 5/1983 |

(Continued)

OTHER PUBLICATIONS

International Search Report and Written Opinion dated Oct. 25, 2016 from corresponding International Patent Application No. PCT/EP2016/069835.

(Continued)

*Primary Examiner* — Audrey K Bradley

(57) ABSTRACT

Embodiments relate to a turbine for an exhaust gas turbocharger, which has a turbine housing in which are provided a first and a second flow duct that each has an inlet region and an outlet region. A self-regulating rotary slide valve, which has an adjustable flow duct closure element, is arranged in the inlet region of the flow ducts.

7 Claims, 4 Drawing Sheets

(56) References Cited

U.S. PATENT DOCUMENTS

| | | | |
|---|---|---|---|
| 4,100,742 A * | 7/1978 | Harp, Jr. | F02B 37/02 60/602 |
| 4,776,168 A | 10/1988 | Woollenweber | |
| 4,825,523 A * | 5/1989 | Nakazawa | F01D 17/18 164/98 |
| 5,025,629 A | 6/1991 | Woollenweber | |
| 2011/0126812 A1 * | 6/2011 | Miyashita | F01N 13/107 123/703 |
| 2012/0060494 A1 * | 3/2012 | Sato | F02B 37/025 60/602 |
| 2014/0219849 A1 * | 8/2014 | Styles | F02B 33/38 418/55.1 |
| 2014/0230432 A1 | 8/2014 | Kindl et al. | |
| 2015/0233283 A1 * | 8/2015 | Smiljanovski | F02B 37/025 60/602 |
| 2015/0300243 A1 * | 10/2015 | Myers | F01D 17/105 60/602 |
| 2015/0315961 A1 * | 11/2015 | Uhlenhake | F02B 37/12 60/602 |
| 2017/0370279 A1 * | 12/2017 | Stilgenbauer | F02B 37/025 |

FOREIGN PATENT DOCUMENTS

| | | |
|---|---|---|
| DE | 102007036937 A1 | 2/2009 |
| DE | 102010008411 A1 | 8/2011 |
| DE | 102010050171 A1 | 5/2012 |
| WO | 2007054754 A1 | 5/2007 |

OTHER PUBLICATIONS

German Search Report dated Jun. 2, 2016 for corresponding German Patent Application No. 10 2015 218 335.1.

Chinese First Office Action dated May 8, 2019 for corresponding Chinese Application No. 201680055769.0.

\* cited by examiner

TURBINE FOR AN EXHAUST TURBOCHARGER

CROSS REFERENCE TO RELATED APPLICATIONS

This application is a continuation of International application No. PCT/EP2016/069835, filed Aug. 22, 2016, which claims priority to German application No. 10 2015 218 335.1, filed on Sep. 24, 2015, each of which is hereby incorporated by reference herein in its entirety.

FIELD OF INVENTION

The invention relates to a turbine for an exhaust gas turbocharger, which has a turbine housing in which are provided a first and a second flow duct that each have an inlet region and an outlet region.

BACKGROUND

A turbine for an exhaust gas turbocharger is known from DE 10 2010 008 411 A1. This turbine has a turbine housing containing a turbine wheel that can be acted upon by an exhaust gas from an internal combustion engine and having at least two channels which are fluidically separated from one another at least in certain regions and through which the exhaust gas can flow. At least one adjustable valve is also provided. This valve has a closing position that closes a bypass duct and an open position which at least partially opens the bypass duct. This valve allows at least part of the exhaust gas to bypass the turbine wheel. In that context, in at least one position of the valve, the at least two channels are fluidically at least partially separated from one another by the valve in a separating region. Furthermore, the valve has at least one intermediate position in which the bypass duct is closed and the at least two channels are fluidically connected to one another in the separating region. This valve is an axial slide valve or a rotary slide valve which must be actuated, using an actuator, against the pressure exerted by the exhaust gas. Furthermore, in this approach the adjustability of the valve is limited.

SUMMARY

An object of the invention is to specify a turbine for an exhaust gas turbocharger which does not have the above-mentioned drawbacks.

Example embodiments of the present invention provide a turbine for an exhaust gas turbocharger, which has a turbine housing in which are provided a first and a second flow duct that each has an inlet region and an outlet region, wherein a self-regulating rotary slide valve, which has an adjustable flow duct closure element, is arranged in the inlet region of the flow ducts.

The advantages of the invention are that, when during operation of the exhaust gas turbocharger, a pressure difference arises between the two flow ducts, the flow duct closure element the flow closure element is automatically adjusted as a consequence of this pressure difference. This automatic adjustment takes place such that the connecting region between the two flow ducts is opened so that exhaust gas from the flow duct having the higher pressure is routed into the flow duct having the lower pressure. The degree of opening between the two flow ducts is dependent on the prevailing pressure difference. If this pressure difference is greater than a defined pressure difference threshold value, then the transition region between the two flow ducts is fully opened. This self-regulating opening of the flow duct closure element of the rotary slide valve, in dependence on a pressure difference existing between the flow ducts, achieves a possibility for connection between the two flow ducts provided in the turbine housing that is simple, cost-effective, space-saving and favorable to flow.

BRIEF DESCRIPTION OF THE DRAWINGS

Further advantageous properties of the invention arise from the example explanation thereof below, given with reference to the figures. In the drawings.

DETAILED DESCRIPTION

Figure 1:
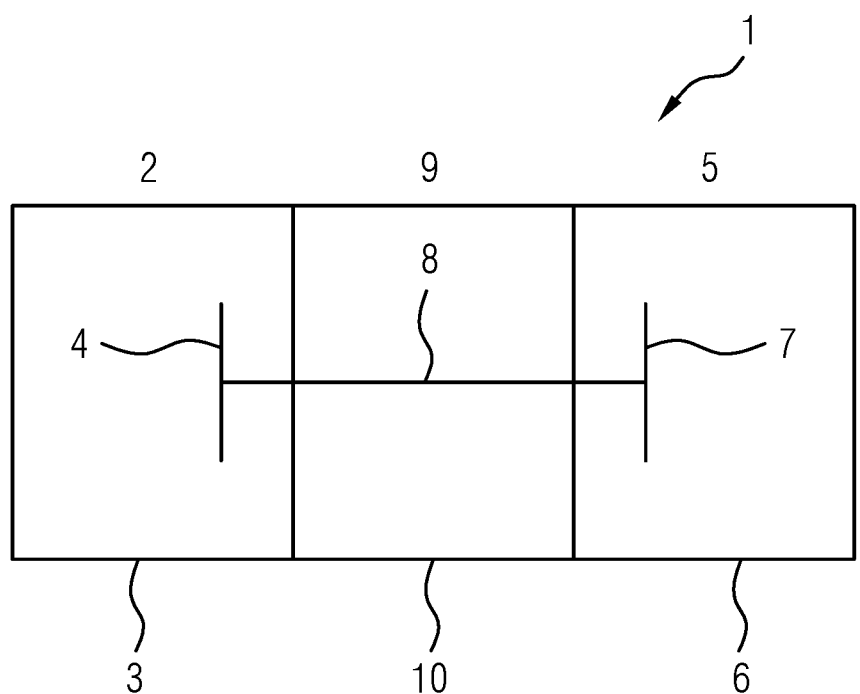
FIG. 1 is a block diagram illustrating the basic construction of an exhaust gas turbocharger.

FIG. 1 is a block diagram illustrating the basic construction of an exhaust gas turbocharger 1.

This exhaust gas turbocharger 1 has a turbine 2 which contains a turbine wheel 4 arranged in a turbine housing 3. The exhaust gas turbocharger 1 also has a compressor 5 which contains a compressor wheel 7 arranged in a compressor housing 6. The exhaust gas turbocharger 1 also has a bearing device 9 which contains a bearing housing 10 that is connected to the compressor housing 6 and the turbine housing 3. A shaft 8, at one end region of which there is the turbine wheel 4 and at the other end region there is the compressor wheel 7, is mounted in the bearing housing 10. In that context, the turbine wheel 4 and the compressor wheel 7 may be secured to the shaft 8 or be an integral constituent of the shaft 8.

During operation of the exhaust gas turbocharger, an exhaust gas stream of a motor vehicle, supplied to the exhaust gas turbocharger, drives the turbine wheel 4, thus turning the shaft 8 which is fixedly connected to the turbine wheel 4. This rotational movement is transferred to the compressor wheel 7, which is also fixedly connected to the shaft 8. Fresh air supplied to the compressor 5 is compressed by means of the compressor wheel 7; this air is supplied, together with the necessary fuel, to the combustion chambers of the engine of the motor vehicle in order to increase engine power.

The turbine housing 3 has two mutually parallel flow ducts, as are used for example in so-called twin-scroll exhaust gas turbochargers. When using a two-channel exhaust gas manifold of the internal combustion engine, this permits separate conveying of the exhaust gases to the turbine wheel. The advantage of this measure is that a mutual negative influence on the individual cylinders during a charge exchange is avoided. In that context, in the exhaust gas manifold the exhaust gas ducts from, for example, two cylinders in the case of four-cylinder engines are combined into one exhaust gas stream, conveyed via respectively one of the flow ducts and re-combined shortly before the turbine wheel. This approach has the result that the exhaust gas back-pressure is reduced and the gas exchange of the internal combustion engine is improved, which in turn leads to lower consumption, increased power and an improvement in the response behavior of the internal combustion engine.

In an internal combustion engine of this kind, there arise operating states in which the two flow ducts must be fluidically connected to one another to different degrees.

In the example embodiments, the two flow ducts are coupled to one another in their inlet region, using a self-regulating rotary slide valve which has a flow duct closure element. Depending on the position of this flow duct closure element, the two flow ducts may be fully decoupled from one another, fully connected to one another or partially connected to one another. The basic setting of the flow duct closure element is such that the two flow ducts are fully decoupled from one another. This basic setting is brought about by using a setting device which has, inter alia, two preloaded spring elements. During operation of the exhaust gas turbocharger, there arise operating states in which, contrary to the above-mentioned basic setting, it is advantageous for the two flow ducts to be coupled to a greater or lesser degree. An operating state of this kind exists when the pressure in the two flow ducts is different. In order to equalize this pressure difference between the two flow ducts, the rotary slide valve is designed to be self-regulating in the sense that its flow duct closure element is moved automatically depending on the prevailing pressure difference in order to open, to a greater or lesser degree, the connection region between the two flow ducts. This opening allows exhaust gas from the higher-pressure flow duct to be routed into the other, lower-pressure flow duct.

There follows a more detailed explanation of two example embodiments for the configuration of a rotary slide valve of this type, with reference to FIGS. 2 to 8.

Figure 2:
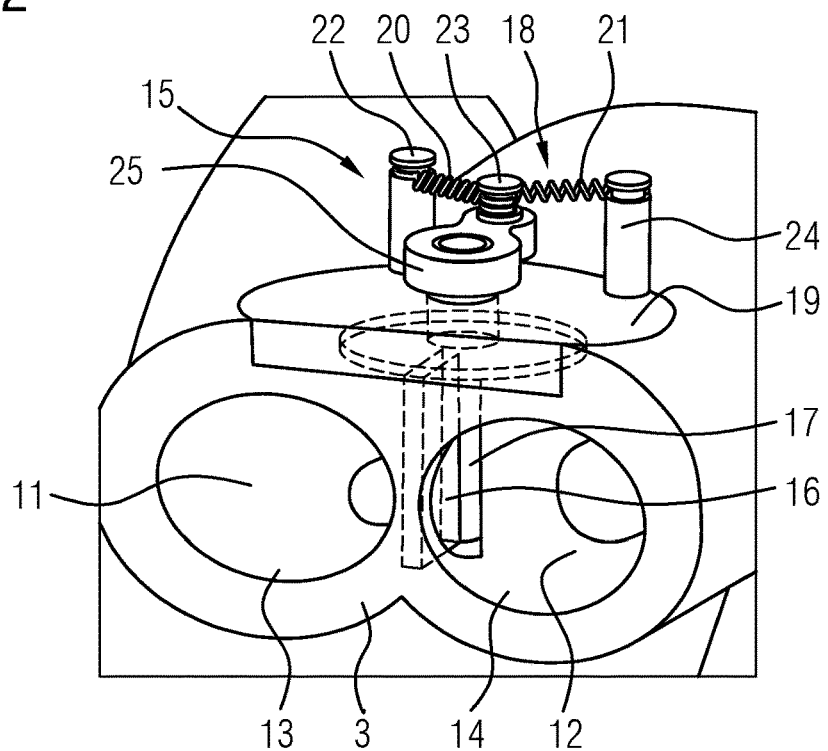
FIG. 2 is a first perspective diagram illustrating a first example embodiment for a turbine having a self-regulating rotary slide valve.

FIG. 2 is a first perspective diagram illustrating a first example embodiment for a turbine having a self-regulating rotary slide valve. The figure shows the inlet region of the turbine housing 3 of this turbine 2, in which the exhaust gas from the internal combustion engine is introduced into the turbine housing 3. The inlet regions 13, 14 of the two flow ducts 11, 12 are also positioned in this inlet region of the turbine housing 3. What FIG. 2 does not show is that the outlet regions of these flow ducts 11, 12 are brought back together in order to supply the conveyed hot exhaust gas to the turbine wheel so as to drive the latter.

A self-regulating rotary slide valve 15, which has an adjustable flow duct closure element 16, is provided in the inlet region of the flow ducts 11, 12. Furthermore, the rotary slide valve 15 has an actuating arm 17 which is connected to the flow duct closure element 16 or is made in one piece therewith. This actuating arm 17 is a constituent part of a setting device 18 which also includes a holding plate 19, setting springs 20 and 21, spring holder elements 22, 23 and 24 and a connecting element 25.

In its basic setting, shown in FIG. 2, the flow duct closure element 16 closes the connection region between the two flow ducts 11 and 12, so that these flow ducts 11 and 12 are fluidically separated from one another. Furthermore, in the basic setting shown in FIG. 2, the flow ducts 11 and 12 are open for the exhaust gas which is supplied to them from the exhaust gas manifold and which enters the respective flow duct in the axial direction, so that this exhaust gas may flow into the flow ducts unhindered.

The basic setting, shown in FIG. 2, of the flow duct closure element 16 is brought about and maintained by the two setting springs 20 and 21 each being provided with a certain preload which is chosen so as to bring about the stated basic setting of the flow duct closure element.

As shown in FIG. 2, one end region of the setting spring 20 is secured to a spring holder element 22, and the other end region of the setting spring 20 is secured to a spring holder element 23. Also, one end region of the setting spring 21 is secured to a spring holder element 24, and the other end region of the setting spring 21 is also secured to the spring holder element 23. The spring holder elements 22 and 24 are secured to the holding plate 19. The spring holder element 23 is connected to the upper end region of the actuating arm 17 by means of the connecting element 25.

In the event of rotation of the flow duct closure element 16, this rotation is transferred, by the actuating arm 17, to the connecting element 25 and thence to the spring holder element 23, which is consequently also rotated.

Figure 3:
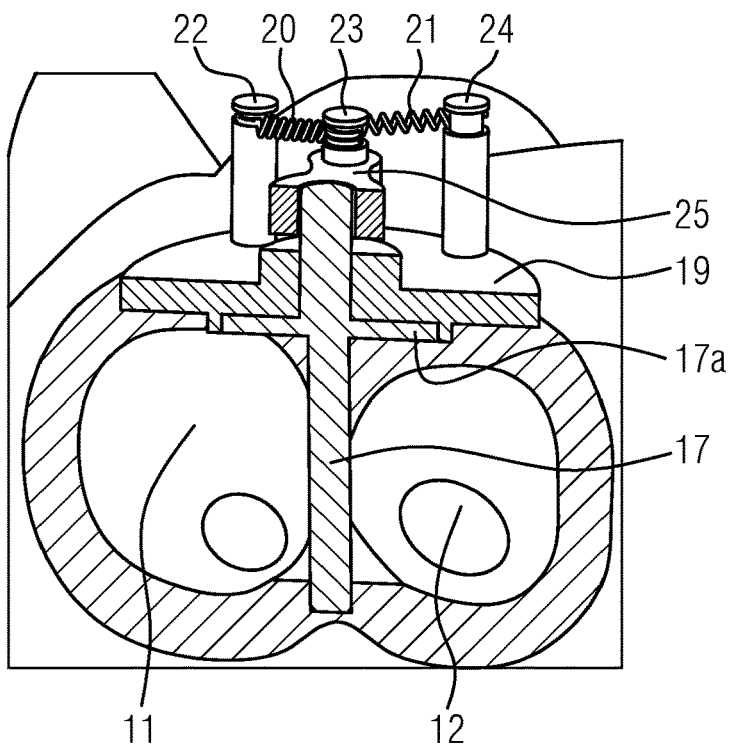
FIG. 3 is a second perspective diagram illustrating the first example embodiment for a turbine having a self-regulating rotary slide valve.

FIG. 3 is a second perspective diagram illustrating the first example embodiment for a turbine having a self-regulating rotary slide valve. This FIG. 3 shows that the inner region of the holding plate 19 is hollow, and the radially inner region has a step-shaped recess in which a transverse arm 17a of the actuating arm 17 is mounted rotatably. As in FIG. 2, the flow duct closure element 16, which in FIG. 3 is arranged behind the actuating arm 17 and therefore is not visible in this FIG. 3, is in its basic setting and closes the connection region between the two flow ducts 11 and 12, so that these flow ducts 11 and 12 are fluidically separate from one another.

Figure 4:
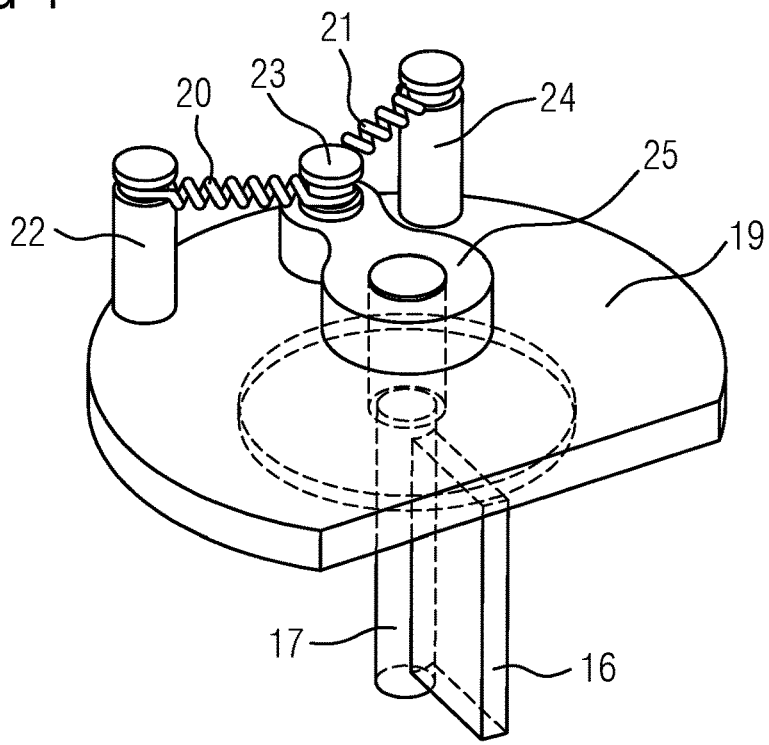
FIG. 4 is a third perspective diagram illustrating the first example embodiment for a turbine having a self-regulating rotary slide valve.

FIG. 4 is a third perspective diagram illustrating the first example embodiment for a turbine having a self-regulating rotary slide valve. This representation shows the components of the rotary slide valve in an oblique view from above, without the turbine housing.

Figure 5:
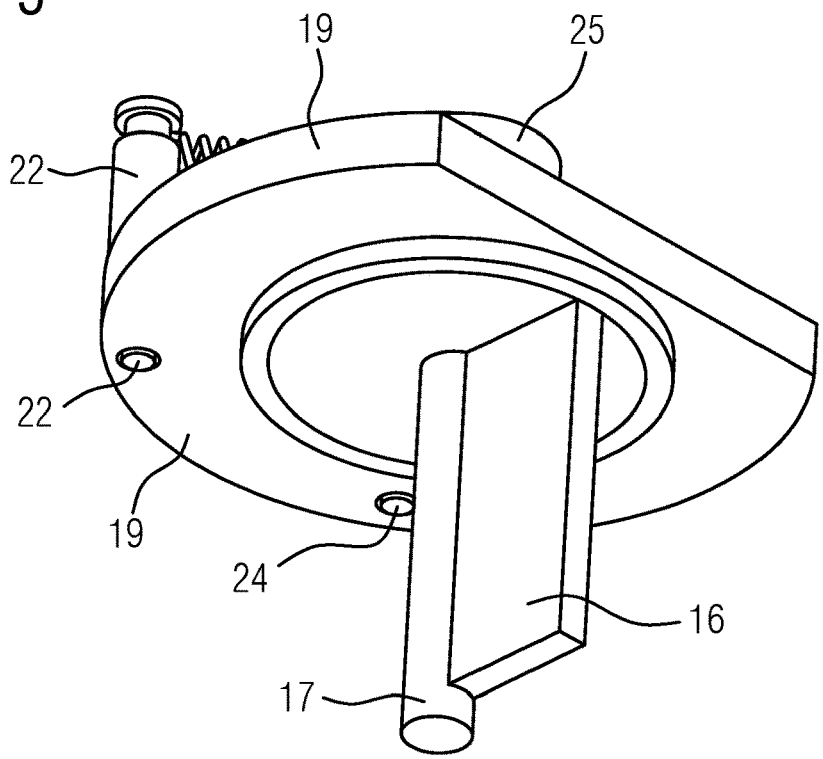
FIG. 5 is a fourth perspective diagram illustrating the first example embodiment for a turbine having a self-regulating rotary slide valve.

FIG. 5 is a fourth perspective diagram illustrating the first example embodiment for a turbine having a self-regulating rotary slide valve. This representation shows the components of the rotary slide valve in an oblique view from below, without the turbine housing. This figure shows, in particular, the attachment of the spring holder elements 22 and 24 on the holding plate 19, and a one-piece design for the actuating arm 17 with the flow duct closure element 16.

Figure 6:
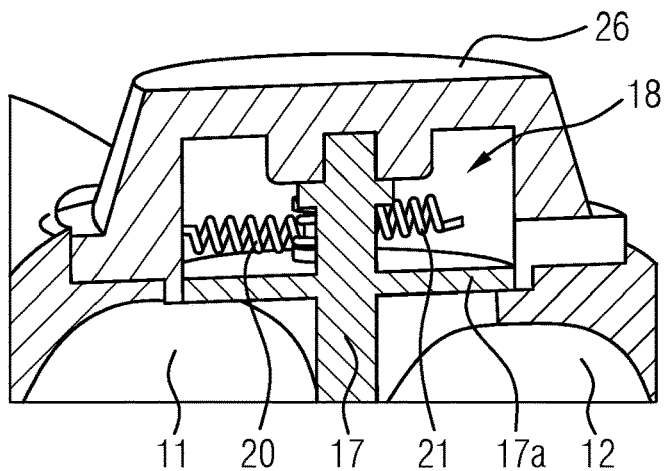
FIG. 6 is a first perspective diagram illustrating a second example embodiment for a turbine having a self-regulating rotary slide valve.

FIG. 6 is a first perspective diagram illustrating a second example embodiment for a turbine having a self-regulating rotary slide valve. This second example embodiment differs from the first example embodiment shown in FIGS. 2 to 5 in that, in the second example embodiment shown in FIG. 6, the top of the setting device 18 is covered by a cover 26, so that in particular the preloaded setting springs 20 and 21 are not arranged openly on the upper side of the turbine housing, but rather are protected in the interior of the cover 26. The second example embodiment shown in FIG. 6 differs from the first example embodiment shown in FIGS. 2 to 5 also in that the first end regions of the setting springs 20 and 21 are not secured to special spring holder elements 22 and 24 that are attached to a holding plate, but rather are secured in the interior of the cover 26, either to this cover itself or to a receiving portion of the turbine housing.

Figure 7:
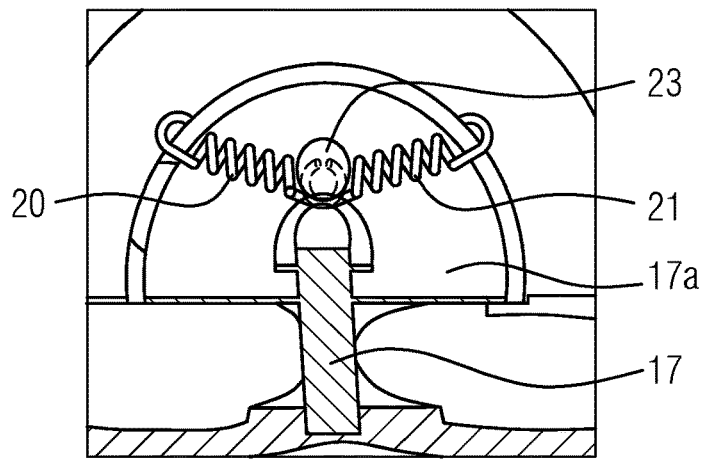
FIG. 7 is a second perspective diagram illustrating the second example embodiment for a turbine having a self-regulating rotary slide valve.
Figure 8:
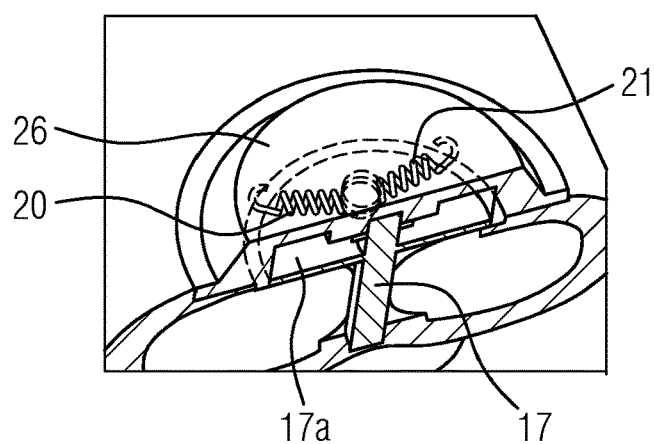
FIG. 8 is a third perspective diagram illustrating the second example embodiment for a turbine having a self-regulating rotary slide valve.

This is more evident from FIGS. 7 and 8 which show a second and a third perspective diagram illustrating the second example embodiment for a turbine having a self-regulating rotary slide valve.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

The invention claimed is:

1. A turbine for an exhaust gas turbocharger, comprising:
a turbine housing,
a first flow duct and a second flow duct, each flow duct disposed in the turbine housing and having an inlet region and an outlet region,
a self-regulating rotary slide valve, which has an adjustable flow duct closure element, is arranged in the inlet region of each of the first and second flow ducts;
an actuating arm being part of the rotary slide valve, the actuating arm connected to the flow duct closure element or is made in one piece therewith; and
a setting device being part of the slide valve, and the actuating arm is connected to the setting device, the setting device including components which serve for a basic setting of the flow duct closure element;
wherein the setting device includes at least two preloaded setting springs, the spring forces of the at least two preloaded setting springs apply a moment to the flow duct closure element.

2. The turbine as claimed in claim 1, wherein the basic setting of the flow duct closure element is predefined by the spring forces of the preloaded setting springs.

3. The turbine as claimed in claim 2, wherein, in the basic setting of the flow duct closure element, both flow ducts allow exhaust gas supplied thereto to pass through the flow ducts.

4. The turbine as claimed in claim 2, wherein, in the basic setting of the flow duct closure element, both flow ducts are fluidically separated from one another at the respective inlet regions thereof.

5. The turbine as claimed in claim 1, wherein the flow duct closure element is rotatable by a pressure difference in the flow ducts such that the flow ducts are fluidically connected to one another.

6. The turbine as claimed in claim 5, wherein an existence of a predefined pressure difference in the flow ducts causes the flow duct closure element to rotate such that the inlet region of the flow duct in which the lower pressure exists is closed to exhaust gas applied to the inlet region of the flow ducts.

7. The turbine as claimed in claim 5, wherein an existence of a predefined pressure difference in the flow ducts causes the flow duct closure element to rotate such that a transition region between the two flow ducts is fully open.

\* \* \* \* \*